UNITED STATES PATENT OFFICE.

RICHARD WEIL, OF FRANKFORT-ON-THE-MAIN, GERMANY.

TANNIN-SILVER-ALBUMEN COMPOUND.

982,910. Specification of Letters Patent. Patented Jan. 31, 1911.

No Drawing. Application filed June 28, 1909. Serial No. 504,767.

*To all whom it may concern:*

Be it known that I, RICHARD WEIL, doctor of philosophy, pharmaceutical chemist, and resident of Friedberger-Anlage No. 9, Frankfort-on-the-Main, Kingdom of Prussia, German Empire, have invented new and useful Improvements in Tannin-Silver-Albumen Compounds, of which the following is a specification.

This invention relates to a process for the manufacture of a tannin-silver-albumen compound which is insoluble in gastric juice and sparingly soluble in intestinal fluid.

It has been found that when a solution of albumen has been treated with tannin and silver nitrate, the liquid separated from the precipitate still contains valuable constituents, namely albumen and silver, which can be recovered by suitable treatment of the liquid.

The process consists in treating the liquid separated from the precipitate, with tannin and exposing the precipitate thus produced to diffused daylight, whereupon it assumes a yellowish brown to mouse gray color. The exposed precipitate is then washed with water and dried. The final product is a tannin-silver-albumen compound containing up to 3.75 per cent. of silver. It has been found that a product with this proportion of silver is particularly suitable for certain therapeutical purposes.

The following example illustrates the invention:—900 grams of dry egg-albumen are dissolved in 30 liters of water; to this solution I add a solution of 150 grams of tannin in 5 liters of water. This produces a white precipitate of tannin-albumen; without removing the precipitate (that is, without filtering) I add to the liquid a solution of 180 grams of silver nitrate in 5 liters of water. The resulting mass is shaken and then exposed to light, whereby the originally white precipitate is caused to assume a gray color. When this gray precipitate has been filtered off, about 21 liters of filtrate are obtained. This is preferably distributed between three flasks and to each portion is added tannin until no further precipitate is produced, which is the case when a total quantity of about 35 grams of tannin (dissolved in 1 liter of water) has been used. The precipitate thus produced is then exposed to diffused daylight until it has become uniformly yellowish brown to mouse gray. The product contains 3.75 per cent. of silver. It is soluble only in very small proportion in water both at the temperature of the room and on warming; an alcoholic extract yields a strong blue color with ferric chlorid. Neither albumen nor silver can be detected in the solution; in a hot alcoholic extract traces of albumen can be detected but no silver. In nitric acid the product dissolves in part to a Bordeaux red solution, the odor of nitrous acid being detected; tests for tannin, silver and albumen give negative results. In hydrochloric acid the product is insoluble, but it dissolves completely in ammonia to a greenish brown changeable colored solution. It is also soluble in caustic potash solution of 15 per cent. strength or less. In a mixture of pepsin and highly dilute hydrochloric acid the product is nearly insoluble at 37° C.

In order to make a preparation containing approximately any desired content of silver between a trace and 10 per cent., a certain quantity of the liquid separated from the original precipitate as hereinbefore described is mixed with a calculated proportion of albumen and silver nitrate, (corresponding to the desired composition of the final product) the precipitate thus obtained and the supernatant liquid being protected from light; there is then added a solution of tannin in small excess, whereupon the whole is exposed to diffused daylight; the silver-albumen-tannin compound thus obtained is washed and dried.

The products prepared according to the invention have valuable therapeutic properties. They are especially applicable in cases of diarrhea and infectious intestinal catarrh, as well as in cases of intestinal tuberculosis, both for human and animal subjects.

The dose which practice has shown to be best is for adults $\frac{1}{2}$ gram three times a day, for children $\frac{1}{4}$ gram three times a day, for infants from $\frac{1}{16}$ to $\frac{1}{8}$ gram three times a day, for calves and dogs from 1 to 2 grams three times a day.

Having thus described my invention and the best means I know of carrying the same into practical effect, I claim:—

1. A process for the manufacture of a tannin-silver-albumen compound insoluble in gastric juice and sparingly soluble in intestinal fluid, which process consists in first adding tannin to a liquid which has been separated from a precipitate obtained by the action of tannin and silver nitrate on a solution of albumen, the said addition being continued so long as a precipitate is produced, then exposing the last-named precipitate to diffused daylight, then washing the exposed precipitate and finally drying it.

2. A tannin-silver-albumen compound insoluble in gastric juice, sparingly soluble in intestinal fluid, containing a proportion of silver between a trace and 10 per cent., sparingly soluble in water, yielding with alcohol a solution which is colored blue by ferric chlorid, partly soluble in nitric acid to a Bordeaux red solution, insoluble in hydrochloric acid, soluble in ammonia to a greenish brown solution, soluble in dilute solution of caustic potash and substantially insoluble in pepsin and highly diluted hydrochloric acid at 37° C.

In testimony, that I claim the foregoing as my invention, I have signed my name in presence of two witnesses, this 16th day of June 1909.

RICHARD WEIL.

Witnesses:
JEAN GRUND,
ROBERT BÜHL.